US006539693B2

(12) United States Patent
Krone et al.

(10) Patent No.: US 6,539,693 B2
(45) Date of Patent: Apr. 1, 2003

(54) HARVESTING MACHINE, ESPECIALLY A SELF-PROPELLED PICK-UP CHOPPER

(75) Inventors: Bernard Krone, Spelle (DE); Dieter Berth, Neustadt (DE); Thomas Strobel, Stolpen OT Langenwolmsdorf (DE); Karl-Heinz Radke, Wilthen (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 0 days.

(21) Appl. No.: 09/845,687

(22) Filed: Apr. 30, 2001

(65) Prior Publication Data

US 2001/0037633 A1 Nov. 8, 2001

(30) Foreign Application Priority Data

May 4, 2000 (DE) .......................................... 100 21 657

(51) Int. Cl.[7] .............................................. A01D 61/00
(52) U.S. Cl. ......................................... 56/16.6; 56/153
(58) Field of Search ...................... 241/101.01, 101.02, 241/101.74; 56/16.4 R, 16.6, 16.4 A, 16.4 B, DIG. 1, 500, 504, DIG. 9

(56) References Cited

U.S. PATENT DOCUMENTS

| 4,696,432 A | * | 9/1987 | Russ et al. ............. 241/101.742 |
| 5,822,962 A | * | 10/1998 | Wagstaff et al. ....... 241/101.762 |
| 5,863,005 A | * | 1/1999 | Bramstedt et al. .... 241/101.742 |
| 5,970,695 A | * | 10/1999 | Dunn ........................ 172/311 |
| 6,073,431 A | * | 6/2000 | Osborne et al. ............ 56/15.7 |
| 6,125,617 A | * | 10/2000 | Villers et al. ............... 56/15.3 |

FOREIGN PATENT DOCUMENTS

| DE | 3535620 | 4/1987 |
| DE | 19638033 | 3/1998 |
| DE | 19638034 | 3/1998 |
| DE | 19638033 | 4/1999 |
| DE | 19638034 | 4/1999 |
| EP | 0492273 | 7/1992 |
| FR | 2539950 | 8/1984 |
| FR | 2692430 | 12/1993 |

* cited by examiner

Primary Examiner—Thomas B. Will
Assistant Examiner—Meredith C. Petravick
(74) Attorney, Agent, or Firm—Jordan & Hamburg LLP

(57) ABSTRACT

Harvesting machine for picking up and chopping corn, wilted grass, green feed and similar harvested material including a feeding device, a chopping device arranged after the feeding device and a conditioning device for conditioning the harvested material arranged after the chopping device. The conditioning device optionally engages a conveying duct. Mounting and dismantling of the conditioning device is simplified because it is connected on one side to a duct pivotable about an essentially horizontal swiveling axis and on the other side rigidly but detachably to a rigid duct. Preferably, the swiveling axis is situated below the pivotable duct such that the swiveling motion of the pivotable duct is directed downward against the traveling direction of the harvesting machine to thereby enable removal of the conditioning device.

36 Claims, 7 Drawing Sheets

HARVESTING MACHINE, ESPECIALLY A SELF-PROPELLED PICK-UP CHOPPER

BACKGROUND OF THE INVENTION

Figure 1:
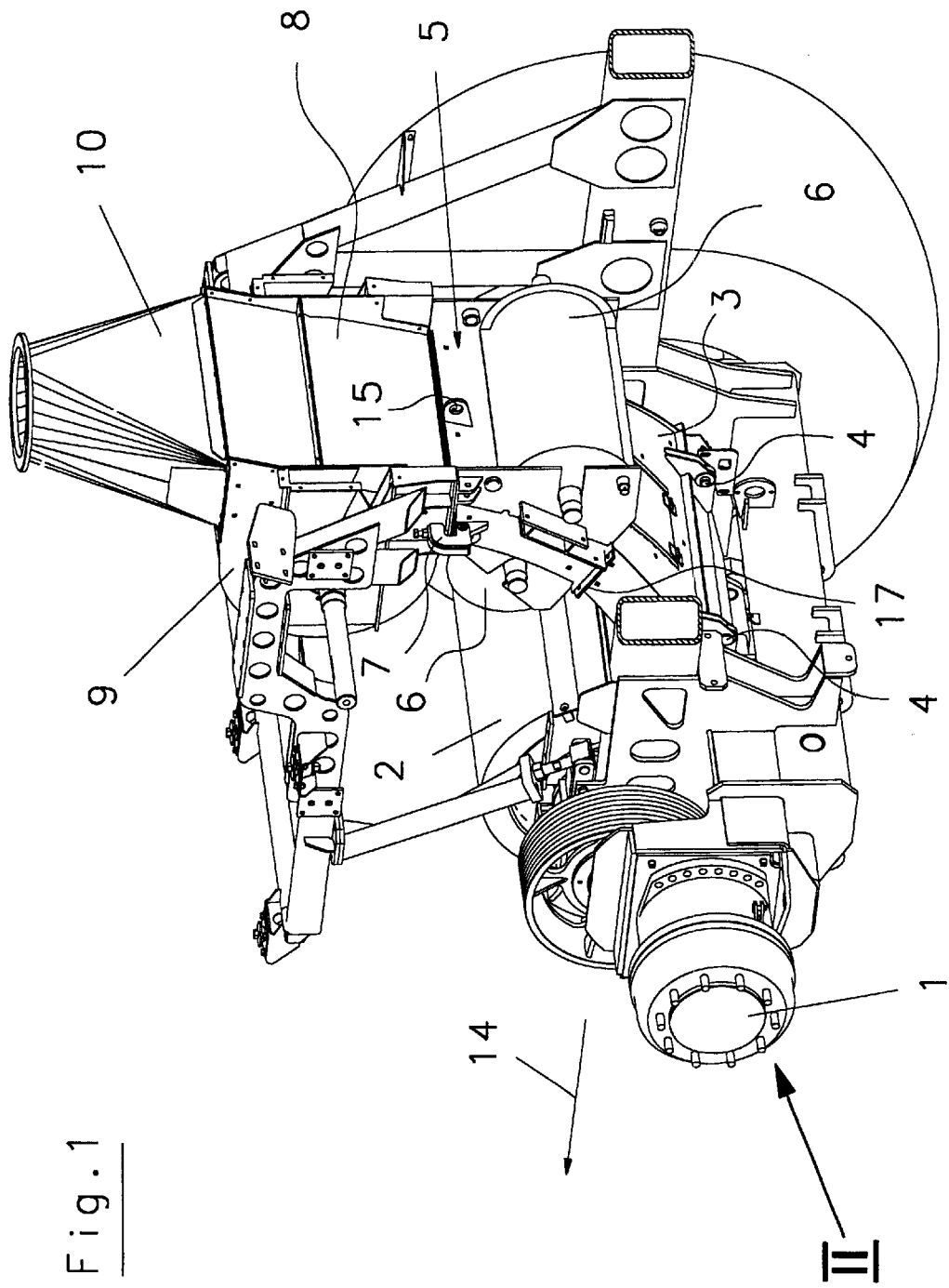

The invention relates generally to a harvesting machine, and more particularly to a self-propelled pick-up chopper for picking up and chopping corn, wilted grass, green feed and similar harvested material. Such harvesting machines frequently are used for harvesting and for comminuting various harvested material to a size suitable for use. For example, when corn is chopped after it is harvested, it is necessary to break up the grains since they are otherwise indigestible for animals as animal feed. The breaking up of the grains takes place in a conditioning device, a so-called cracker, which is arranged after the chopping device and in which the harvested material is passed between nip rollers and broken up in the process. On the other hand, when strictly green feed, such as grass, is harvested, the subsequent passage through a conditioning device after the chopping is unnecessary and would even damage the very moist harvested material by squeezing it. Generic harvesting machines can therefore be operated with and without the conditioning device.

German Patent Publication No. DE 195 38 199 C2 describes a harvesting machine which has two different ducts for transporting the harvested material after it has passed through the chopping device. One of these ducts is smooth and does not have any further processing devices, while the other passes the harvested material into and through a conditioning device. By actuating different opening flaps at the chopping device, the path through the smooth duct or through the duct associated with the conditioning device can be opened up. For this harvesting machine, it is possible to switch over between the two modes of operation very quickly and very easily. However, it is a disadvantage that the conditioning device remains in the machine, loading it with unnecessary weight even if it is not required for the harvesting operation which is being conducted. In addition, the period in which the conditioning device is not required cannot be used for performing the maintenance work on this device, which may be necessary.

German Patent Publication No. DE 196 38 033 C2 shows a generic pick-up chopper with a conditioning device which can be swiveled about a detachable drag bearing towards the front in the driving direction and, after prior removal of the chopping device, can be removed from the chopper or reinstalled. In this chopper, for converting the machine from harvesting corn to harvesting green feed, the conditioning device is removed from the machine. However, the dismantling is expensive since the chopping unit must be removed first. For stability reasons, the detachable construction of the drag bearing is also associated with structural problems and is maintenance-intensive and care-intensive.

The invention therefore relates to the problem of improving a generic harvesting machine structurally so that the installation and dismantling of the conditioning device is simplified.

SUMMARY OF THE INVENTION

In accordance with the invention, this problem is solved by a harvesting machine including a conditioning device which is connected on one side with a duct section which can be pivoted about an essentially horizontal swiveling axis and connected on the other side rigidly but detachably with a rigid region of a conveying duct. Since the conditioning device is connected detachably at one side with the pivotable duct section and at its other side with a rigid region of the conveying duct, the pivotable section of duct serves as a swivel arm for the conditioning device which is swiveled after the connection with the rigid region of the conveying duct together with the pivotable duct section has been undone. In this manner, the conditioning device can be brought into a readily accessible position in which it can be deposited and exchanged and in which it can be removed after its connection with the pivotable duct section has also been undone. The pivotable duct section, functioning as a swiveling arm enables the conditioning device to be located in a region of the machine where its removal without prior removal of other units, such as the chopping device, is possible. Since the swiveling axle is not directly at the conditioning device but rather at the pivotable duct section, the drag bearing does not have to be detachable and the above-described disadvantages associated with a detachable drag bearing are avoided.

Guiding devices for transporting the chopped harvested material after removal of the conditioning device can also be provided at the housing. Most reliably and simply, however, the conditioning device is exchanged for a smooth section of duct without exchanging processing elements. The connecting elements between the conditioning device and the pivotable duct section, on the one hand, and the rigid section of conveying duct, on the other, are therefore preferably also designed for accommodating a smooth duct section.

Further advantages and details of the invention are set forth in the subsequent description of a preferred embodiment of the invention shown in the accompanying drawings.

IN THE DRAWINGS

Figure 2:
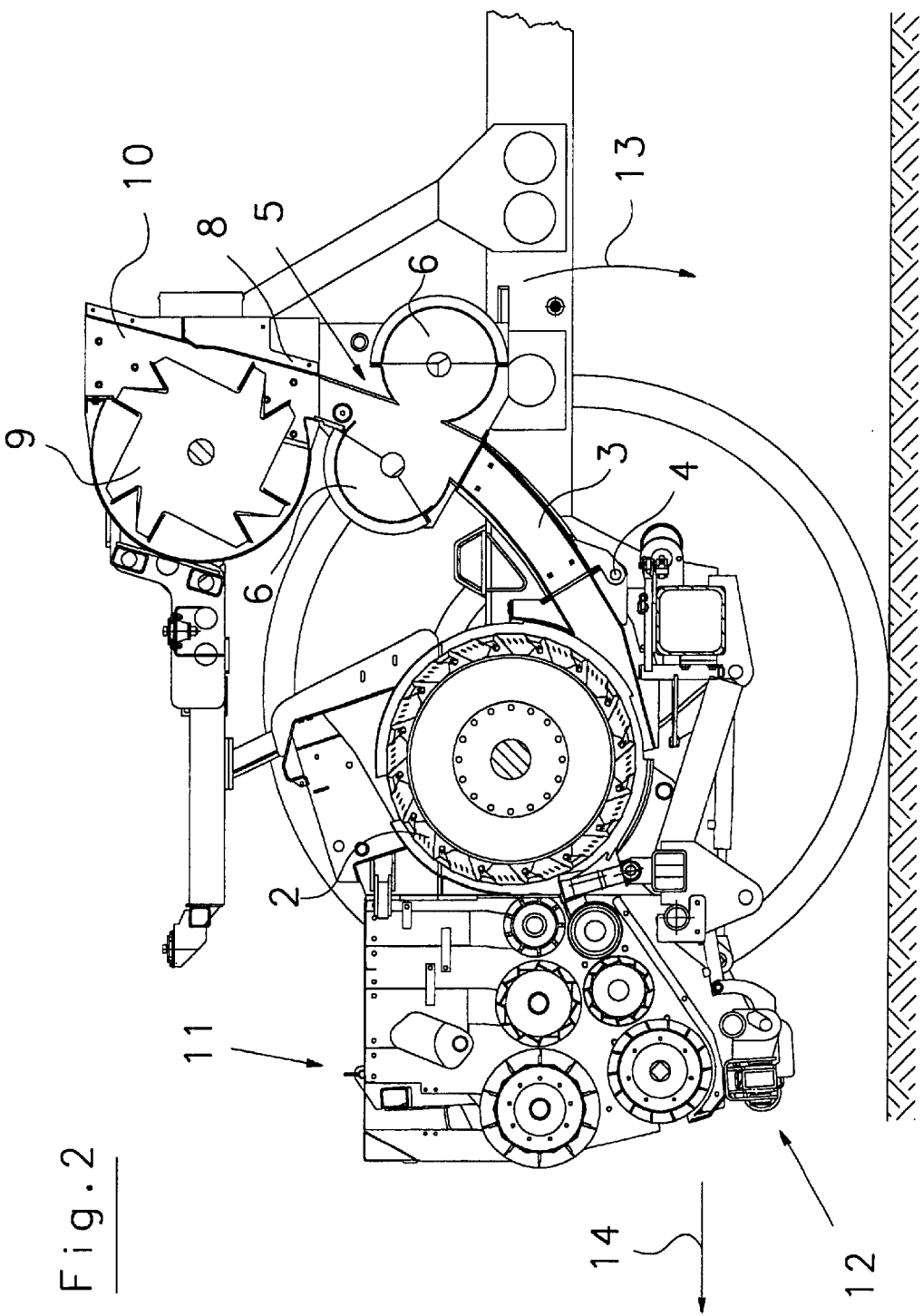
Figure 3:
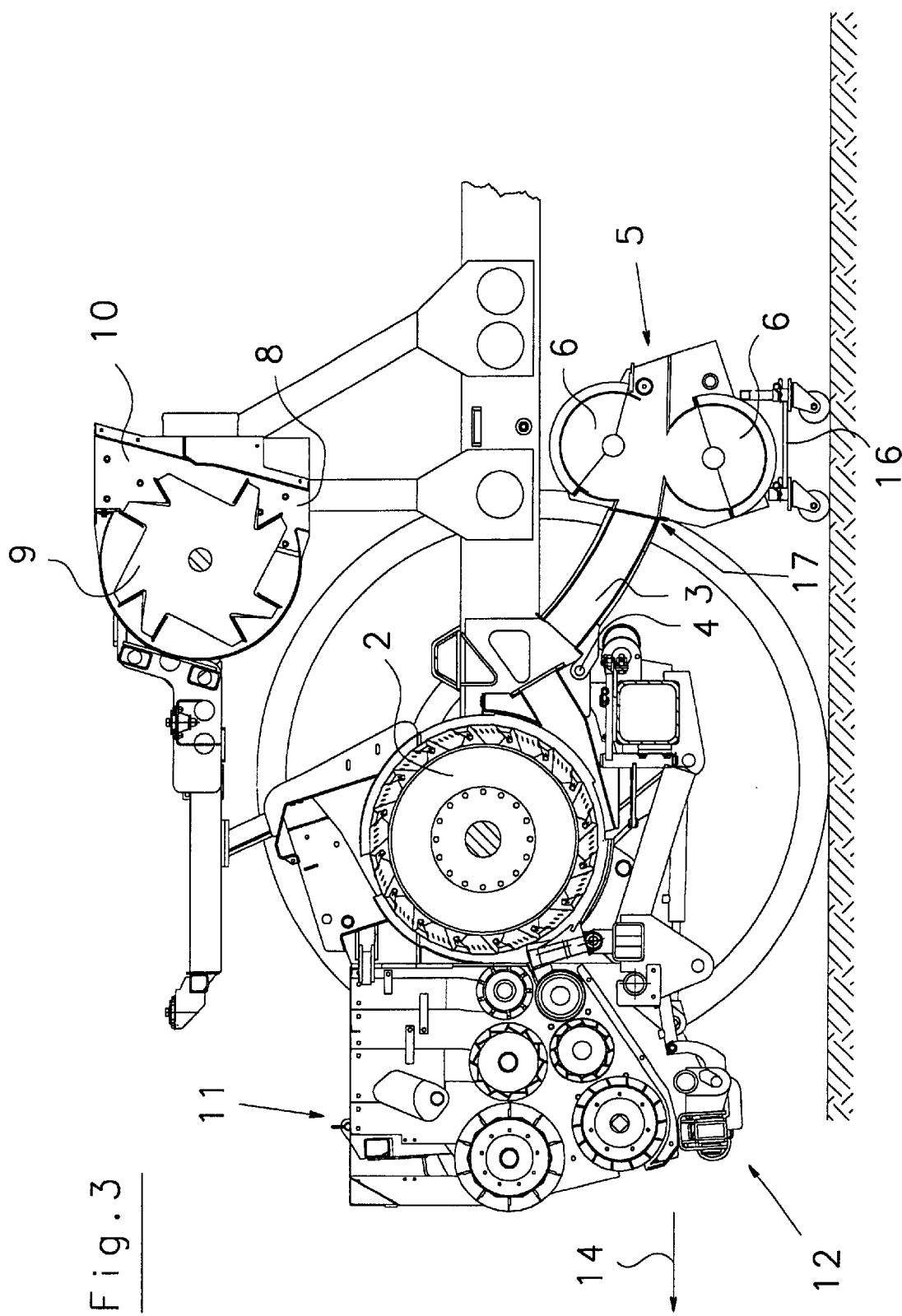
Figure 4:
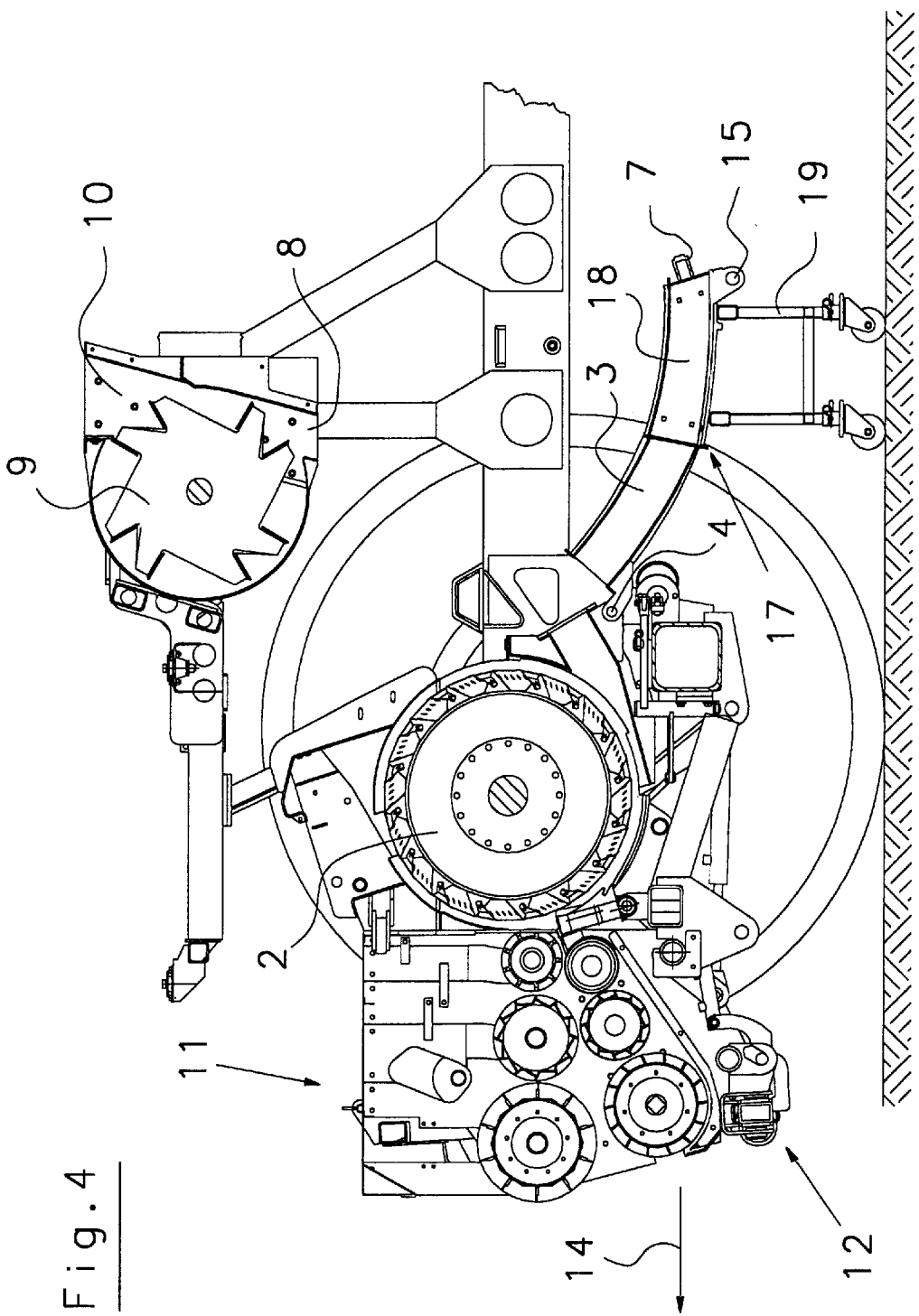
Figure 5:
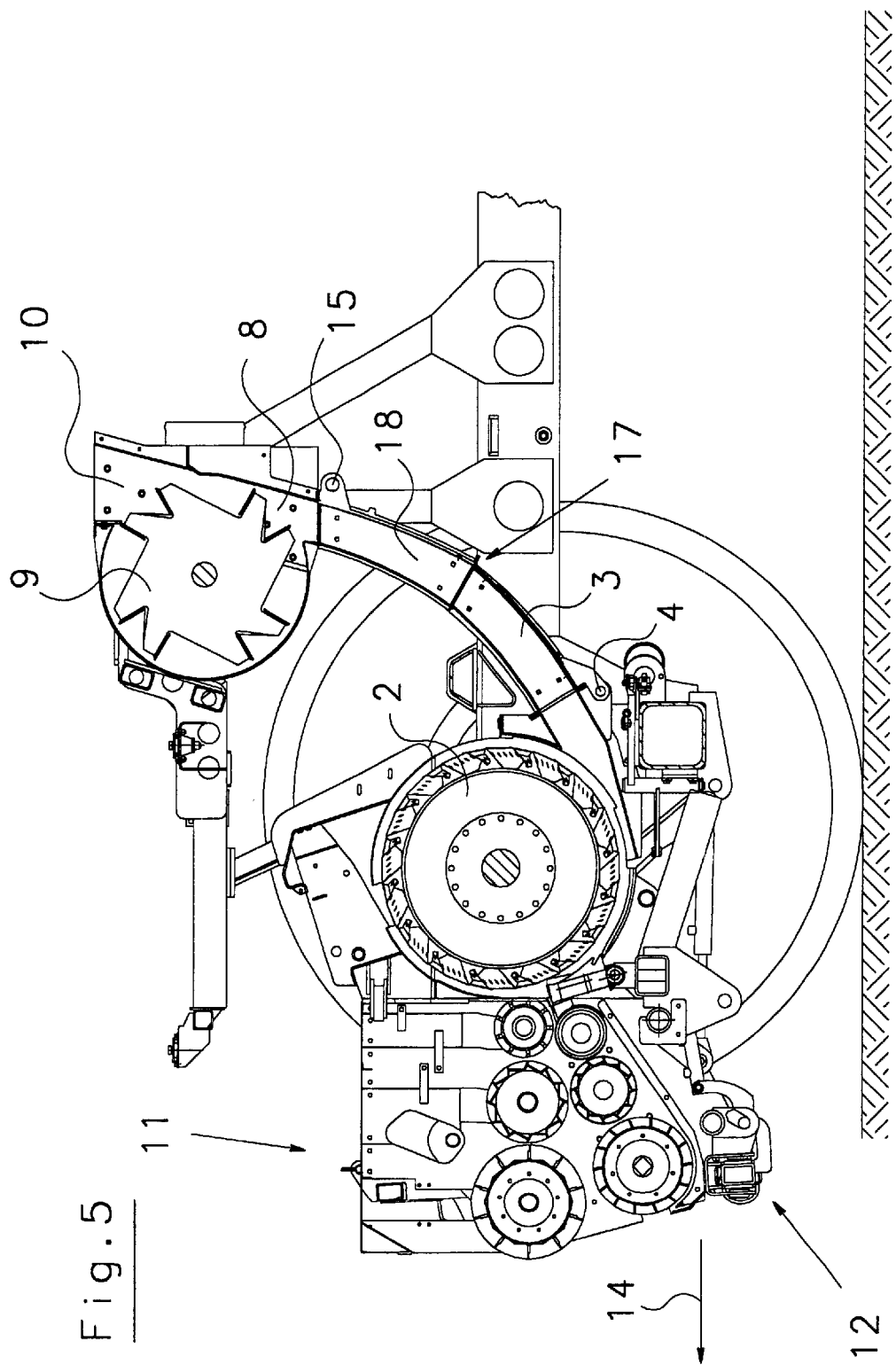
Figure 6:
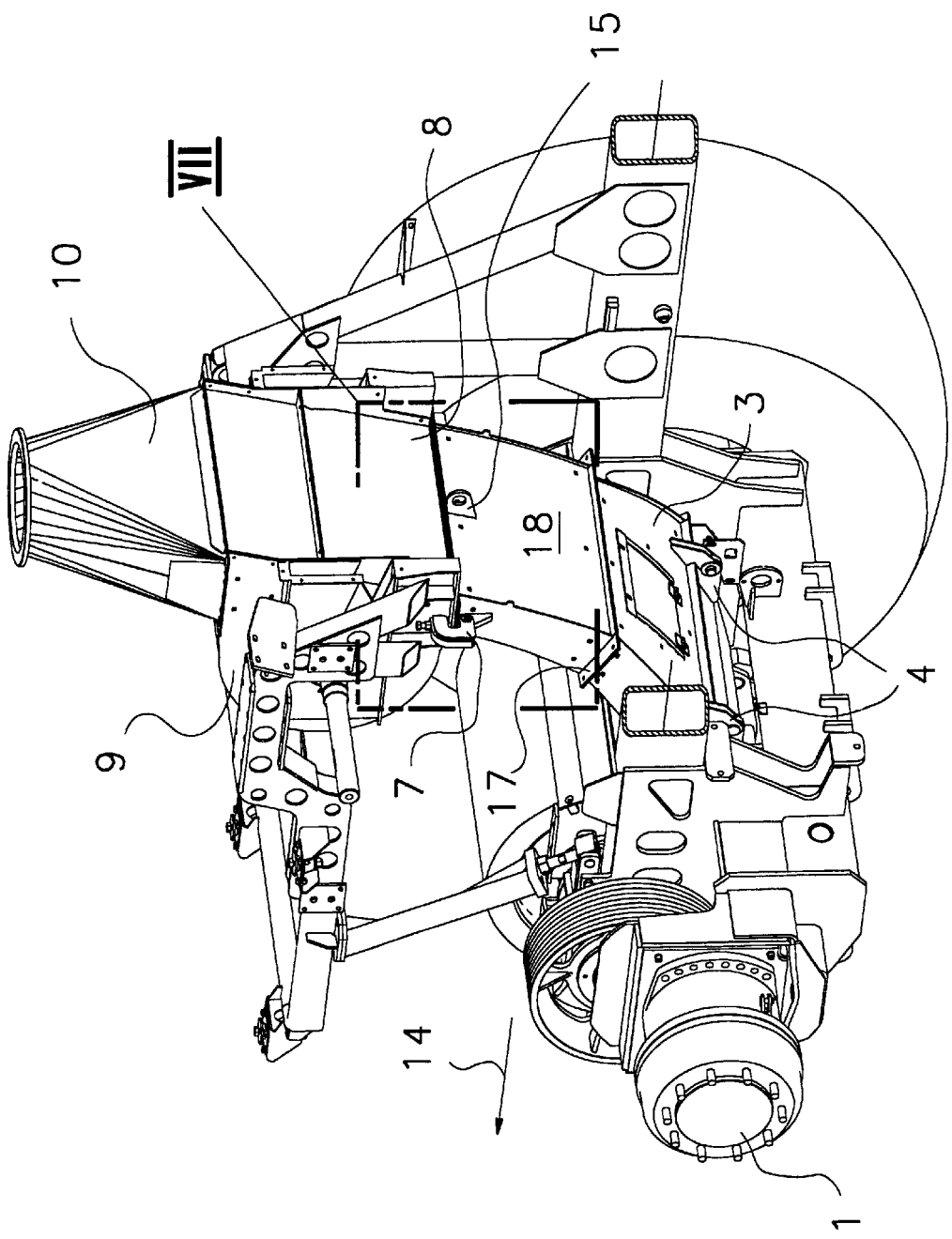
Figure 7:
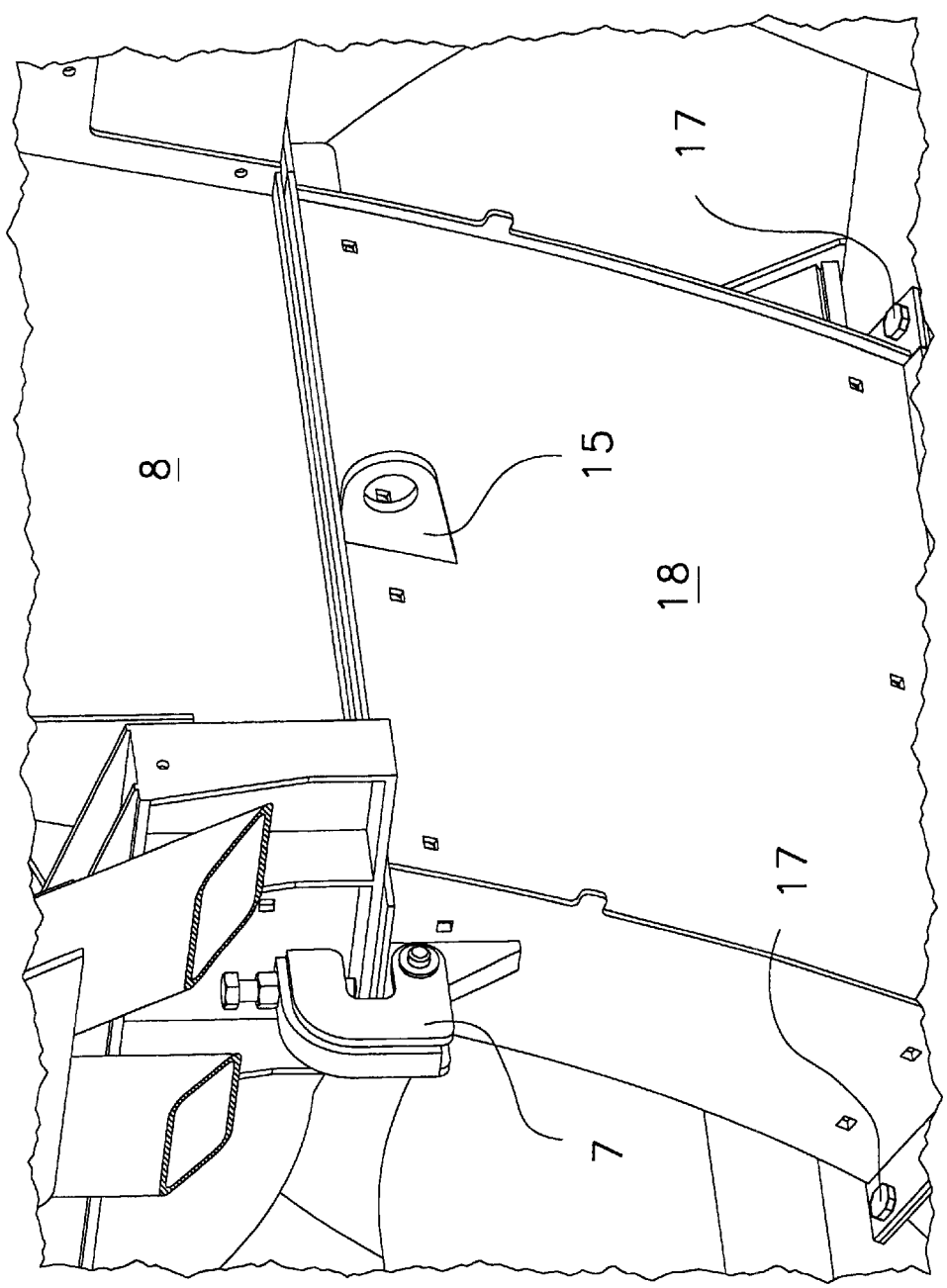

FIG. 1 shows a perspective view of the part of a harvesting machine with a chopping device, a conveying duct and a conditioning facility, FIG. 2 shows a side view from the direction II of the harvesting machine in FIG. 1, partially in section, FIG. 3 shows the harvesting machine of FIG. 2 with the conditioning device, which has been swiveled down together with the pivotable duct section, FIG. 4 shows the harvesting machine of FIG. 3 after the conditioning device has been exchanged for a smooth duct section, FIG. 5 shows the harvesting machine of FIG. 4 with duct sections swiveled in once again, FIG. 6 shows the harvesting machine of FIG. 5 in a perspective view, obliquely from the rear, and FIG. 7 shows a detailed enlargement of section VII in FIG. 6.

DESCRIPTION OF THE PREFERRED EMBODIMENTS

FIG. 1 shows a harvesting machine in accordance with the invention which includes a chopper drum 2 mounted in a region of a front axle 1 and which adjoins a pivotable duct section 3 which is swiveled over drag bearings 4 about a horizontal swiveling axis. A conditioning device 5 with two nip rollers 6 is connected on one side with the pivotable duct section 3. On the other side of the conditioning device 5, there are connecting elements 7 which adjoin a rigid duct section in which a post-accelerator 9 engages. The post-accelerator 9 conveys the harvested material through an ejection shaft 10 to an ejection elbow (not shown). FIGS. 2–5 show a feeding device 11 arranged ahead or in front of the chopper drum 2, as well as coupling elements 12 which can be connected with an external attachment fitting, such as a pick-up or a corn dentition.

FIGS. 1 and 2 show the operating state for harvesting and processing corn with the installed conditioning device 5. For dismantling the conditioning device 5, the connecting elements 7 between the conditioning device 5 and the rigid duct section 8 are undone and the pivotable duct section 3, together with the conditioning device 5, is swiveled into the position shown in FIG. 3. For this purpose, the swiveling axis of the drag bearing 4 is arranged on the underside of the pivotable duct section 3 so that the swiveling motion takes place downward and in the direction of the arrow 13 counter to the traveling direction 14 of the harvesting machine. The conditioning device 5 can thus be lowered into a region of the machine which is behind the essential installations, such as the chopper drum 2, the feeding device 11 and the corresponding transmission elements, and in which sufficient space is available for dismantling the conditioning device 5. If the pivotable duct section 3, as in the embodiment shown, extends in the non-swiveled position from the swiveling axis obliquely upward, the conditioning device 5, after the connecting elements 7 are undone, swivels automatically due to its own weight. To prevent the conditioning device from falling down, it has a handle in the form of a welded-on ring 15 in the vicinity of the rigid duct region 8 which can be suspended in a lifting and lowering device, such as a hoist, which then lowers the conditioning device 5 appropriately slowly. Alternatively or additionally, a hydraulic adjustment device can also engage the pivotable duct section 3.

FIG. 3 shows a position in which the conditioning device 5 is lowered onto an auxiliary frame 16 which is on rollers. The auxiliary frame 16 accommodates the conditioning device 5 and serves to store and transport it. In this position, the connection 17 between the pivotable duct section 3 and the conditioning device 5 can be undone and the conditioning device 5 removed. The connection 17 is established preferably by bolting to appropriately provided flanges (using bolts), which represent a structurally simple but stable fastening possibility. As an alternative to the auxiliary frame 16 on rollers, the conditioning device 5 can also have one or more seats for connection with roller elements, such as pins, onto which the rollers or legs with rollers can be slipped. The roller element may also be integrally molded permanently to the conditioning device 5, thereby remaining on it during use in the field. The same applies also to the smooth duct section 18, which is shown in FIGS. 4–7, for which the conditioning device 5 was exchanged, in comparison to FIGS. 1–3.

FIG. 4 shows the attachment of the smooth duct section 18, which is on a correspondingly higher auxiliary frame 19 on rollers and was moved with the auxiliary frame 19 to the swiveled duct section 3 so that it could be bolted to it. FIG. 5 shows the operating position, in which the smooth duct section 18 has been swiveled back in for harvesting and processing green feed, the harvested material, after passing through the chopping drum, passing through the smooth duct section 18 without the conditioning device. FIG. 6 once again shows the operating state with the smooth duct section 18 in a view corresponding to that of FIG. 1. In FIG. 7, a detailed enlargement of one of the connecting elements 7 is shown. The connecting elements 7 are preferably constructed as quick-release elements in the form of clamps which facilitate the detachment of the smooth duct section 18 or the detachment of the conditioning device 5 and a rapid reattachment, optionally even by being constructed as a snap connection so that they contribute to the user friendliness of the inventive harvesting machine.

What We claim is:

1. A harvesting machine for picking up and chopping corn, wilted grass, green feed and similar harvested material, with a conditioning device for the harvested material, which is disposed after a feeding device and a chopping device and optionally engages a conveying duct or can be removed from the conveying duct, wherein the conditioning device is connected, on the one hand, with a pivotable duct, which can be pivoted about an essentially horizontal swiveling axis and, on the other, is connected rigidly but detachably with a rigid region of the conveying duct, the pivotable duct defining a passage through which the harvested material is passed.

2. The harvesting machine of claim 1, wherein the connections of the conveying duct with the conditioning device have connecting elements which are constructed suitably for alternatively taking up a smooth duct without processing elements for the harvested material instead of the conditioning device.

3. The harvesting machine of claim 1, wherein the swiveling axis is disposed at the underside of the pivotable duct such that the swiveling motion of the pivotable duct, for removing the conditioning device, is directed downward against a direction of travel of the harvesting machine.

4. The harvesting machine of claim 2, wherein the connection between the conditioning device or the smooth duct and the rigid region of the conveying duct is formed by quick-release connections.

5. The harvesting machine of claim 2, wherein the connection between the conditioning device or the smooth duct and the pivotable duct is formed by bolts.

6. The harvesting machine of claim 1, wherein the pivotable duct, when not in a swiveled position, extends obliquely upward from the swiveling axis.

7. The harvesting machine of claim 2, wherein at least one of the conditioning device and the smooth duct, in the vicinity of the connection with the rigid region of the conveying duct, has a handle element for suspension in a raising and lowering device.

8. The harvesting machine of claim 2, wherein an auxiliary frame with rollers, as accessory, is constructed for accommodating at least one of the conditioning device and the smooth duct.

9. The harvesting machine of claim 2, wherein at least one of the conditioning device and the smooth duct has at least one seat for connection with at least one rolling element.

10. The harvesting machine of claim 2, wherein a rolling, element is permanently integrated with at least one of the conditioning device and the smooth duct.

11. A harvesting machine, comprising:
a chopping device arranged to receive harvested material and chop the harvested material;
a conditioning device arranged to receive the chopped, harvested material from said chopping device and condition the chopped, harvested material;
a conveying duct arranged to receive the conditioned harvested material from said conditioning device, said conditioning device being detachably connected to said conveying duct; and
a first duct providing a conduit between said chopping device and said conditioning device for harvested material, said first duct being connected on one side to said conditioning device and being pivotable with respect to said chopping device about a pivot axis situated at an opposite side of said first duct such that upon pivoting of said first duct with said conditioning device connected thereto, said conditioning device is movable out of engagement with said conveying duct.

12. The harvesting machine of claim 11, wherein said pivot axis about which said first duct is pivotable is substantially horizontal.

13. The harvesting machine of claim 11, further comprising:
   first connecting elements for connecting said conveying duct and said conditioning device together; and
   second connecting element for connecting said first duct and said conditioning device together.

14. The harvesting machine of claim 13, wherein said first and second connecting elements are arranged to enable a second, smooth duct to be interchangeable with said conditioning device.

15. The harvesting machine of claim 11, wherein said pivot axis is situated on an underside of said first duct such that pivotal movement of said first duct is downward and rearward opposite a direction of travel of the harvesting machine.

16. The harvesting machine of claim 11, further comprising quick release connections for connecting said conditioning device and said conveying duct together.

17. The harvesting machine of claim 11, further comprising bolts for connecting said conditioning device and said first duct together.

18. The harvesting machine of claim 11, wherein said first duct extends obliquely upward from said pivot axis when providing the conduit between said chopping device and said conditioning device.

19. The harvesting machine of claim 11 further comprising a handle arranged in connection with said conditioning device proximate an outlet side of said conditioning device.

20. The harvesting machine of claim 11, wherein said conditioning device is adapted to be accommodated on an auxiliary frame having rollers.

21. The harvesting machine of claim 11, wherein said conditioning device includes at least one seat adapted for connection with at least one rolling element.

22. The harvesting machine of claim 11, wherein said conditioning device includes a rolling element permanently integrated therewith.

23. The harvesting machine of claim 11, further comprising a feeding device into which harvested material is fed, said chopping device being arranged to receive harvested material from said feeding device.

24. A harvesting machine, comprising:
   a chopping device arranged to receive harvested material and chop the harvested material;
   an attachment arranged after said chopping device in a direction of travel of the harvested material;
   a conveying duct arranged after said attachment in the travel direction of the harvested material, said attachment being detachably connected to said conveying duct; and
   a first duct providing a conduit between said chopping device and said attachment for harvested material, said first duct being connected on one side to said attachment and being pivotable with respect to said chopping device about a pivot axis situated at an opposite side of said first duct such that upon pivoting of said first duct with said attachment connected thereto, said attachment is movable out of engagement with said conveying duct.

25. The harvesting machine of claim 24, wherein said attachment is a conditioning device arranged to receive the chopped, harvested material from said chopping device and condition the chopped, harvested material.

26. The harvesting machine of claim 24, wherein said attachment is a second, smooth duct.

27. The harvesting machine of claim 24, wherein said pivot axis about which said first duct is pivotable is substantially horizontal.

28. The harvesting machine of claim 24, further comprising:
   first connecting elements for connecting said conveying duct and said attachment together; and
   second connecting element for connecting said first duct and said attachment together.

29. The harvesting machine of claim 24, wherein said pivot axis is situated on an underside of said first duct such that pivotal movement of said first duct is downward and rearward opposite a direction of travel of the harvesting machine.

30. The harvesting machine of claim 24, further comprising quick release connections for connecting said attachment and said conveying duct together.

31. The harvesting machine of claim 24, further comprising bolts for connecting said attachment and said first duct together.

32. The harvesting machine of claim 24, wherein said first duct extends obliquely upward from said pivot axis when providing the conduit between said chopping device and said attachment.

33. The harvesting machine of claim 24, further comprising a handle arranged in connection with said attachment proximate an outlet side of said attachment.

34. The harvesting machine of claim 24, further comprising a feeding device into which harvested material is fed, said chopping device being arranged to receive harvested material from said feeding device.

35. A harvesting machine, comprising:
   a chopping device arranged to receive harvested material and chop the harvested material;
   a conditioning device arranged to receive the chopped, harvested material from said chopping device and condition the chopped, harvested material;
   a conveying duct arranged to receive the conditioned harvested material from said conditioning device, said conditioning device being detachably connected to said conveying duct;
   a first duct section providing a conduit between said chopping device and said conditioning device for harvested material, said first duct section being connected on one side to said conditioning device and being pivotable with respect to said chopping device about a pivot axis situated at an opposite side of said first duct section such that upon pivoting of said first duct section with said conditioning device connected thereto, said conditioning device is movable out of engagement with said conveying duct;
   first connecting elements for connecting said conveying duct and said conditioning device together; and
   second connecting element for connecting said duct section and said conditioning device together.

36. The harvesting machine of claim 35, wherein said first and second connecting elements are arranged to enable a second, smooth duct section to be interchangeable with said conditioning device.

* * * * *